March 19, 1968 G. J. FEDERIGHI 3,373,580
PORTABLE AND SELF-CONTAINED APPARATUS FOR
CHILLING AND FROSTING BEVERAGE GLASSES
Filed Oct. 17, 1966 2 Sheets-Sheet 1
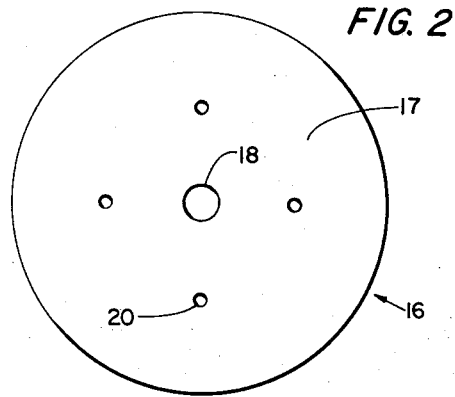
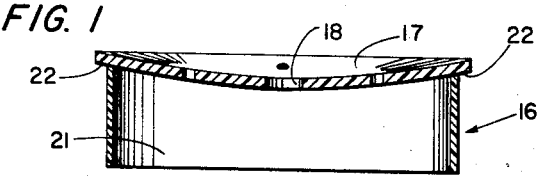
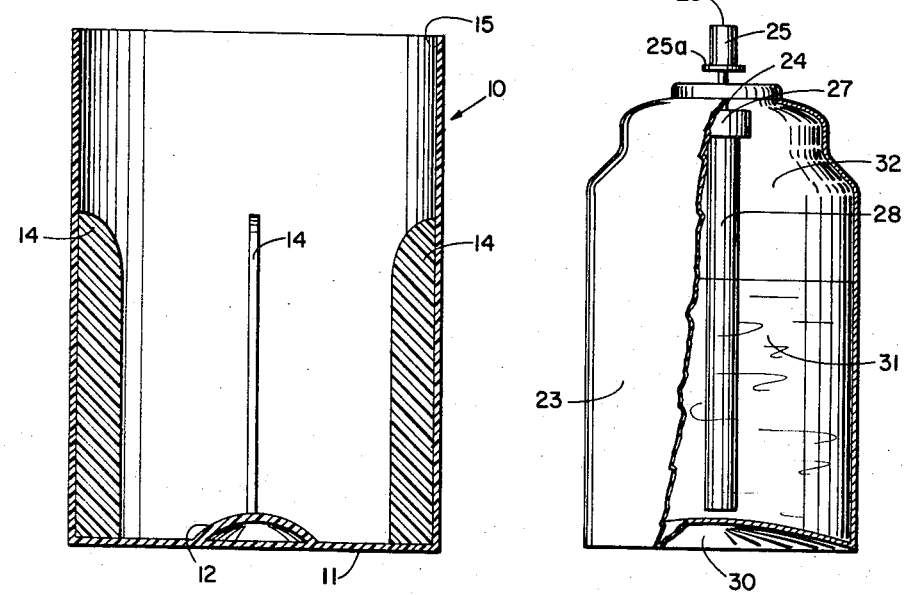
INVENTOR.
GEORGE J. FEDERIGHI
ATTORNEY March 19, 1968  G. J. FEDERIGHI  3,373,580
PORTABLE AND SELF-CONTAINED APPARATUS FOR
CHILLING AND FROSTING BEVERAGE GLASSES
Filed Oct. 17, 1966  2 Sheets-Sheet 2
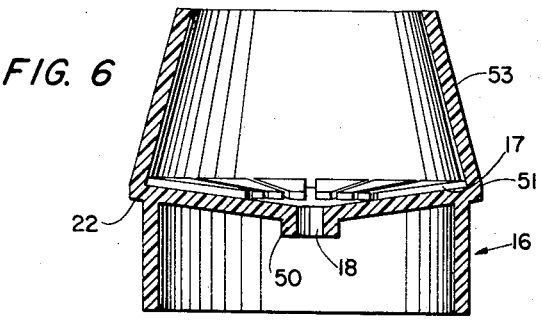
FIG. 6
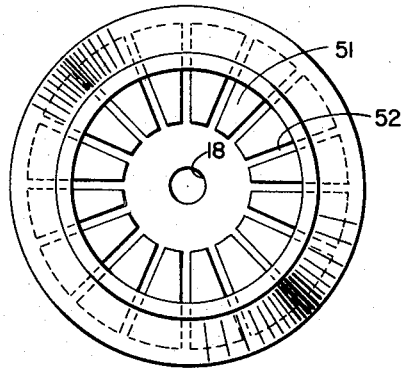
FIG. 7
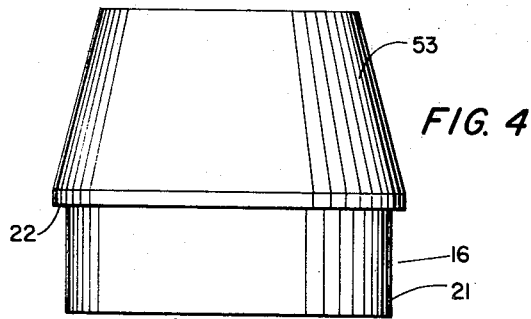
FIG. 4
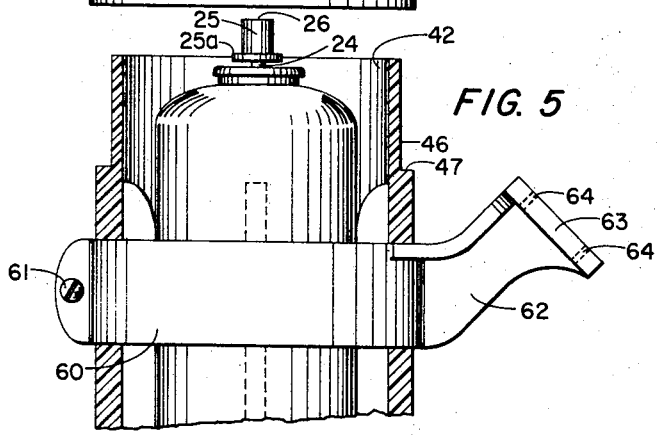
FIG. 5
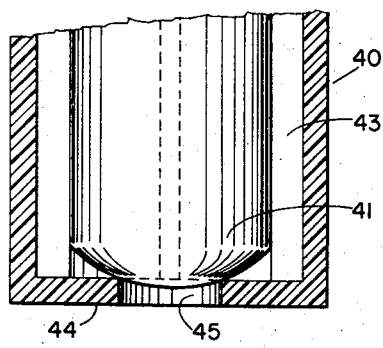
INVENTOR.
GEORGE J. FEDERIGHI
BY
ATTORNEY United States Patent Office 3,373,580
Patented Mar. 19, 1968

3,373,580
PORTABLE AND SELF-CONTAINED APPARATUS FOR CHILLING AND FROSTING BEVERAGE GLASSES
George J. Federighi, 103 Jamaica, Tiburon, Calif. 94920
Continuation-in-part of application Ser. No. 507,469, Nov. 12, 1965. This application Oct. 17, 1966, Ser. No. 587,039
12 Claims. (Cl. 62—293)

ABSTRACT OF THE DISCLOSURE

A portable and self-contained apparatus for chilling and frosting beverage glasses including a housing for centering and retaining a conventional container of low pressure, nontoxic liquid refrigerant such as "Freon," having an axial self-sealing valve and nozzle. The housing has a cover platform through which the container nozzle partially projects thereabove and engages a portion of the nozzle in non-sealing engagement so as to open the valve and permit the refrigerant to escape through the nozzle and vaporize. The glasses are chilled and frosted by inverting a glass and placing the bowl thereof over the nozzle with the rim of the bowl on the cover platform and exerting a downward pressure to open the valve nozzle and spray the inside of the bowl with refrigerant. The cover platform is also relieved at intervals beneath the rim so that the interior of the bowl is always at atmospheric pressure. The sublimation of the refrigerant upon release from the nozzle cools the glass of the bowl thereby reducing the temperature of the ambient air on the outside of the bowl to cause frosting on the outside without any residue of the refrigerant or otherwise on the inside. The whole frosting is accomplished in a matter of seconds, and the valve closes upon release of the pressure of the glass against the cover platform. The preferred form of cover platform has an upstanding peripheral wall to confine the ambient air and hasten and intensify the frosting.

---

This invention relates to portable and self-contained apparatus for chilling and frosting beverage glasses such as cocktail glasses, wine glasses, and the like, although as described hereinafter, larger volume beverage glasses may be used if certain modifications are made.

The present application is a continuation-in-part of the application filed November 12, 1965, Ser. No. 507,469 and entitled "Device for Chilling and Frosting Drinking Glasses."

In the devices of the prior art all utilize high pressure liquid $CO_2$ for chilling cocktail glasses and the like, by spraying the liquid $CO_2$ into the bowls of the inverted glasses. The underlying operation of these prior art apparatus, as is clearly indicated and stated, was to spray liquid $CO_2$ into the bowl of a cocktail glass or the like, while it was inverted over a valve, with the rim thereof in engagement with a movable platform. The release of the liquid $CO_2$ under pressure of the range of from 700 to 1,000 p.s.i. into the confined volume within the bowl resulted in the deposition of carbon dioxide snow on the interior of the bowl. The glass was then removed from the platform where it was again subjected to atmospheric pressure, with the result that the sublimation of the carbon dioxide snow cooled the interior of the glass resulting in a frosting on the interior of the bowl. Such devices never became commercially successful for many reasons. Liquid carbon dioxide is sold in 20 pound and 50 pound cylinders and is under a pressure of from 700 to 1,100 p.s.i. depending upon the outside temperature. Such pressures are extremely dangerous. Furthermore, the 20 and 50 pound cylinders of liquid $CO_2$ are not portable for the ordinary person and therefore required some sort of permanent fixture for holding the same remote from the place of use. This meant not only that the structure involved was a fixed installation, and was not portable, but that there was grave danger of having the liquid gasify in the line to the spray nozzle, due to changes in temperature. The spraying of $CO_2$ gas would not do the job, and it was essential for their operation to have only liquid $CO_2$ sprayed into the inverted bowl. It was not an uncommon occurrence to have the gas pressures build up in the liquid $CO_2$ cylinders and in the lines to an extent that the moment the valve was opened, it would release gas and blow the drinking glass toward the ceiling or wall as if it were a propelled projectile. Also, the extremely cold temperatures involved at the valve opening was such that frost formed around the valve opening and frequently closed the same, making the device inoperative. Because of the intense cold of $CO_2$ liquid and gas it is impossible to use a small orifice. Furthermore, liquid $CO_2$ is not a refrigerant and has not been commercially used as a refrigerant because of its physical properties.

In the present invention applicant has found a way to avoid all of these difficulties and to make a truly portable, self-contained unit which may be moved from place to place as desired, requiring no fixed installation and with no extra or outside connections of any kind.

Furthermore, the present device uses a relatively low pressure refrigerant which is safe for home use and complies with all the safety codes of the several States and Federal regulations.

Another object of the invention is to provide a device which will release the refrigerant gas and liquid into the bowl of a cocktail or other beverage glass, to immediately cool and refrigerate the mass of glass making up the bowl so that the cooled or refrigerated glass bowl will condense the ambient water vapor of the surrounding air to form a frost on both the inside and the outside of the glass bowl.

Another object is to chill and frost cocktail and other beverage glasses, where there is no possibility of harmful residue remaining after sublimation because only the ambient water vapor does the frosting on the inner and outer surfaces of the bowl.

Still another object is the provision of apparatus where the operative valve is actuated when the inverted cocktail or other beverage glass, is placed upon a platform and the platform is depressed by means of pressure on the bottom of the inverted glass.

It is an object of this invention to provide a depressible actuating platform which will direct any excess vapor and liquid from the bowl into guides which convey the same to refrigerate the outer surface of the bowl simultaneously, with means to confine and direct the flow.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

Referring to the drawings:
FIGURE 1 is an exploded vertical section showing the container or holder with the depressible platform directly above;

FIGURE 2 is a top plan view of the depressible platform;

FIGURE 3 is a side elevational view, partly in section, of the well-known pressurized container of the aerosol type which is the reservoir for the low pressure liquid refrigerant;

FIGURE 4 is a variant form of the depressible platform shown in side elevation particularly useful in connection with commercial or professional models;

FIGURE 5 is an elevational view partly in vertical section, of the container or holder for the professional model;

FIGURE 6 is a vertical sectional view of the alternate form of actuating depressible platform shown in FIGURE 4; and FIGURE 7 is a top plan view of the alternate form of actuating platform.

Referring now more particularly to the drawings in the several views of which like reference numerals indicate like parts, and particularly referring to FIGURE 1, there is shown a cylindrical container or holder 10. Obviously it is not necessary that this member should be cylindrical, as it can be of any desirable or convenient shape. The container 10 has a bottom 11 and may be provided with a dimple 12 to help position the refrigerant reservoir container as will be described later. The container or holder 10 is provided with inwardly directed radial vanes 14 which are positioning vanes. These extend from the bottom upwardly but only for a portion of the distance to the top. The mouth 15 of the container or holder 10 is open. The vertically movable platform 16 has a dished outer surface 17 with an axial opening 18. It is surrounded preferably by smaller openings 20 which are radially spaced from the axial opening 18 and spaced from each other. Depending vertically from the dished platform 17 is a skirt 21 of a size and shape to fit easily within the mouth 15 of the container or holder so that the exterior wall of the skirt guides on the interior wall of the holder 10 for easy vertical movement. The annular lip 22 of the movable platform acts as a stop so that the member 16 cannot fall into the holder 10.

Referring now to FIGURE 3, there is shown a pressurized container 23 of the usual aerosol type. This is the reservoir for the liquid refrigerant under low pressure. It is provided with a small outlet tube 24 connected to a nozzle 25 which has an axial small opening 26 in direct connection. The outlet tube 24 on the interior of the pressurized container has a dispensing valve 27 and a dip tube 28 which reaches nearly to the curved bottom 30 of the container. The liquid refrigerant 31 shown in the container or reservoir only partially fills the reservoir providing headspace 32 for gas. The operation of this device is conventional so that when the valve 27 is actuated by vertical depression of the outlet tube 24 and the valve 25, the valve 27 is opened. Pressure in the headspace 32 forces the refrigerant 31 downwardly and then upwardly through the dip tube 28, through the valve means 27 and is sprayed out of the orifice 26 in the nozzle 25. Upon release of the downward pressure on the nozzle 25, it moves upwardly to the position shown in FIGURE 3 which is the non-operative position, under the influence of a spring (not shown) contained within the valve means 27.

The refrigerant 31 shown in the container is "Freon–12" (dichlorodifluoromethane) having a chemical formula of $CCl_2F_2$ made by the "Freon" Products Division of E. I. du Pont de Nemours & Co. (Inc.), although other similar refrigerants under different names may be used, such as "Gentron 12" having a chemical formula of $CCl_2F_2$ which is made by the General Chemical Division of Allied Chemical Co. "Freon–12" is a liquid which at room temperature of between 65° to 70° F. has a vapor pressure of approximately 80 p.s.i.a., which is relatively low pressure compared with the 700 to 1,100 p.s.i. of liquid $CO_2$ at the same temperatures. "Freon–12" has a boiling point of −21.6° F. (−29.8° C.) and is a non-toxic, non-flammable compound of high dielectric strength and thermal stability. While it is not necessary to limit the liquid refrigerant to Freon, it should be understood that any suitable liquid refrigerant of relatively low pressure having similar characteristics is useful for purposes of this invention. When this structure is assembled for use, the container 23 is placed within the holder 10 and is of such size that the outer wall of the container 23 will be axially guided into position and retained in position by the internal vanes 14. The dimple 12 in the bottom of the holder 10 helps to guide and hold the axial positioning of the container 23. It will be observed that the holder 10 with the container 23 therein may be moved as a unit to any place. It will also be observed that the depth of the holder 10 is such as to permit only the nozzle 25 to extend above its top rim. The movable platform 16 is then positioned by placing the nozzle 25 through the axial aperture 18 until the inner surface comes to rest on the annular collar 25a of the nozzle 25, which means that a large portion of the depending skirt is positioned within the wall of the container 10.

The operation of the device is simple and fast. A cocktail glass is inverted and placed on the platform 17 so that the bowl is positioned over the nozzle and the volume within the bowl of the glass is closed off at the perimeter. The holes or apertures 20 are positioned so that they are also within the rim of the inverted cocktail glass. Merely by pressing down on the stem of the glass, the platform 17 moves vertically downward and with this movement, by pressure on the annular collar 25a, the valve 27 within the pressurized container 23 is actuated to spray liquid refrigerant in finely atomized form into the interior of the bowl. The apertures 20 in the platform 17 serve two functions. First, any excess liquid refrigerant is immediately drained off. Excess liquid occurs only when there is an improper extended pressure exerted against the platform. It also relieves any pressure build up within the interior of the glass bowl and immediately reduces that pressure to atmospheric pressure. The orifice 26 of the nozzle 25 is very small and the pressure within the container is sufficient to cause the spray of the liquid in a wide pattern on the interior of the bowl. The spray of the liquid refrigerant Freon is so fine that it immediately sublimates leaving no residue whatever. The sublimation of the liquid refrigerant Freon cools the mass of glass forming the bowl of the cocktail glass or the like, and this in turn cools the ambient air to the point of causing a frosting due to the condensation of moisture in the ambient air on both sides of the bowl. The frost forms immediately both on the inside and the outside of the bowl. It takes about an interval of pressure on the platform of one second or less to properly frost a cocktail glass or the like.

Another form of the apparatus, larger in size and known as the commercial form, is shown in FIGURES 4, 5, 6 and 7. Referring now to FIGURE 5, the container or holder 40 is similar to holder 10, only it is made longer to accommodate a different shape pressurized container 41. It is open at the top 42 and is of any convenient cross-sectional shape but is here shown to be cylindrical. It has inwardly directed radial vanes 43 to guide and hold the container 41 and the bottom 44 may either be solid or have a central opening 45 which not only seats the round bottom of the pressurized container 41, but also makes it possible to get at the interior for cleaning. In this instance, however, the thickness of the sidewall at the top from the opening 42 downwardly is reduced to accommodate the skirt 21 of the vertically movable platform 16. Accordingly the inner wall of the skirt 21 bears for vertical movement on the outer wall 46 of the cut back thickness and the stop if needed, is provided by a shoulder 47. The movable platform 16 is substantially identical with that of FIGURE 2 with a few refinements. It has the same dished surface 17 and the same central axial aperture 18. However, as reinforcement to this aperture and to further guide the nozzle 25, there is an internal annular thickening ring 50. The face of the ring 50 abuts the annular flange 25a of the valve 25. In this form the ring thickened aperture 18 surrounds the valve 25 and to a very large extent and so prevents any lateral wobbling or twisting of the outlet tube 24. In the upper surface 17 of the platform 16 is an annular rubberized ring 51 having radial grooves 52. Ring 51 may be of any suitable material and is preferably resilient. These radial grooves 52 continue outwardly to the collar 53 which projects upwardly from the surface 17 and tapers slightly inwardly as it continues upwardly.

The operation of the movable platform is identical with that described before, but in addition instead of any excess refrigerant being drained back down in through the apertures 20, it passes through the radial grooves 52 where it is confined within the wall 53 and serves to cool the outside of the glass bowl simultaneously with the inside of the glass bowl. It will be understood that the movable platform shown in FIGURES 1 and 2 and in 6 are interchangeable if they are sized correctly.

The additional length of the holder 40 makes it possible to use a larger size pressurized liquid refrigerant reservoir 41. It is provided with precisely the same type of dip tube 28, valve 27 and outlet tube 24, nozzle 25 having a small orifice 26. The larger size liquid refrigerant container 41 also permits the use of another type of refrigerant which is "Freon-22," another fluorocarbon refrigerant made by the "Freon" Products Division of E. I. du Pont de Nemours Co. The pressure of "Freon-22" at ordinary room temperature of about 65 to 70° F. is approximately 180 p.s.i.a. which is relatively a low pressure as compared to the 700 to 1,100 pounds in liquid $CO_2$. "Freon-22" has a boiling point of $-41.4°$ F. ($-40.8°$ C.) and is non-toxic and non-flammable, with high dielectric strength and thermal stability. The larger size apparatus makes possible the use of a little more pressure for faster results, without any danger to the user or the public. "Freon-22" has a formula of $CHClF_2$.

The safety factor in the use of a common non-toxic refrigerant such as "Freon" and "Gentron" cannot be over-emphasized. Liquid carbon dioxide in its sublimation process in going from liquid to solid to vapor or gas phase, expands and increases in volume some 500 times. Thus, there is a great hazard in the build-up of pressure in the transition of $CO_2$ from the liquid to the gas phase. It has been found that this pressure build-up can occur in the line, in the container and even in the bowl of the glass to be chilled. "Freon," on the other hand, does not have anywhere nearly the volumetric change in sublimation and the pressures are more easily handled without danger to the user.

The container of FIGURE 5 may be positioned under the bar in easy reach of the bartender by means of a tapered split ring 60. The halves of the split ring are joined at one side by a nut and bolt or any other suitable arrangement 61. The ring at the opposite is provided with a curved radial neck 62 on which is a positioning plate 63 having suitable apertures 64 therethrough for screws or any other securing means. Due to the taper on the inside of the split ring 60 the container 40 is easily withdrawn as a unit for cleaning, replacement of the pressurized container 41 or for any other purpose.

It will be seen that for the first time the present device provides a self-containing portable apparatus for chilling and frosting cocktail glasses and the like. The relatively low pressure of the refrigerant liquid precludes any breakage of the bowls when contacted by the spray, and at all times pressure build-up inside the bowl is relieved. Although the "Freon" liquid is cold, the apparatus does not have any parts which will clog or become frozen during use or in periods of non-use. Furthermore, "Freon" has less than 10 p.p.m. of moisture content, and so is free from internal moisture freezing hazards.

It should be pointed out that if larger and deeper glasses are required for chilling, the orifice 26 in the nozzle 25 should be increased in size. However, this is merely a function of the volume within the bowl and area of the glass to be cooled in a specified period of time.

I claim:

1. A self-contained portable apparatus for chilling and frosting a drinking vessel comprising a replaceable reservoir container having a spray nozzle to discharge liquid refrigerant under relatively low pressure onto the surface of a vessel to be chilled, said reservoir containing a charge of liquid refrigerant under relatively low pressure, a duct extending from near the bottom of the reservoir to the spray nozzle for the supply of refrigerant thereto, valve means within said reservoir controlling the flow of liquid refrigerant along said duct to the said spray nozzle said valve means being operated by movement of the spray nozzle to discharge liquid refrigerant, a depressible platform coaxial with said duct means and extending over said reservoir with the spray nozzle projecting therethrough in non-sealing engagement, means on said platform engaging a complementary means on said spray nozzle to depress the same, said valve means being actuated when said platform is depressed, and a holder member removably holding and retaining the reservoir in an axial fixed position therein, said holder having a dished bottom portion to engage a complementary portion of the refrigerant reservoir, said vertically depressible platform guiding on the wall of said holder.

2. A self-contained portable apparatus for chilling and frosting a drinking vessel comprising a removable self-contained reservoir having a spray nozzle to discharge liquid refrigerant under relatively low pressure onto the inner surface of a vessel to be chilled, said nozzle having a small axial orifice, said reservoir containing a charge of liquid non-toxic refrigerant under relatively low pressure, a duct extending from near the bottom of the reservoir to the spray nozzle for the supply of refrigerant thereto, self-closing valve means within said reservoir controlling the flow of liquid refrigerant along said duct to the said spray nozzle said valve means being opened by depression movement of the spray nozzle, a depressible platform with relief vents therein coaxial with said duct means and extending over said reservoir with the spray nozzle partially projecting therethrough in non-sealing engagement, means on said platform engaging a complementary means on said spray nozzle to depress the same, said valve means being actuated to release the liquid refrigerant through said nozzle when said platform is depressed, and a holder member removably holding and retaining the said reservoir in an axial fixed position therein, said holder having a dished bottom portion to engage a complementary portion of the refrigerant reservoir, said vertically depressible platform guiding on the wall of said holder.

3. A depressible platform for apparatus chilling and frosting a beverage glass, a horizontal member having an axial opening therethrough, a depending guide for lateral stability during depression of the dished member, a ring member overlaying a portion of the upper surface of the horizontal member and spaced from said axial opening said ring member having radial grooves and an upwardly extending collar at the periphery of said platform, said collar being tapered as it proceeds upwardly but leaving the opening for the presentation of a beverage glass therethrough.

4. A depressible platform for apparatus chilling and frosting beverage glasses in combination, a horizontal dished member having an axial opening for the reception of the spray nozzle therethrough, means associated with said dished member for actuating a valve in response to the downward movement thereof, a downwardly depending guide adjacent the periphery of the dished member for bearing on the wall of said holder extending across its width to a peripheral collar for lateral stability during depression of the dished member, pressure relief means on the upper surface of said horizontal dished member and an upwardly extending collar at the periphery of said dished member, said collar having an open mouth for the presentation of various sized beverage glasses therethrough.

5. Apparatus for chilling and frosting beverage glasses, a holder, a replaceable pressurized liquid refrigerant container of the aerosol type having an axial spray nozzle operable to spray the liquid contents upon downward pressure on the said spray nozzle and to close on release of the pressure, a liquid non-toxic refrigerant having a relatively low pressure in said container and to be dispensed therefrom, a platform member having an axial opening for the partial passage of the said spray nozzle therethrough and with direct non-sealing engagement therewith, a plurality of apertures in said platform adjacent said axial opening, and a depending skirt means adjacent the perimeter of said platform for positioning said platform over said holder and guiding limited vertical movement on the wall of said holder, said holder having a dished bottom portion to engage a complementray portion of the refrigerant reservoir.

6. The apparatus of claim 5 wherein the liquid refrigerant is "Freon–12."

7. The apparatus of claim 5 wherein the liquid refrigerant is "Gentron."

8. The apparatus of claim 5 wherein the pressure of the liquid refrigerant is from 65 to 180 p.s.i.

9. The apparatus of claim 5 wherein the platform member has a flat ring on its outer surface spaced from the axial opening with grooves across the width of said ring, and confined within a peripheral collar extending upwardly from said outer surface.

10. The apparatus of claim 9 wherein the peripheral collar is tapered upwardly.

11. The apparatus of claim 5 wherein the bottom of the holder has an aperture therethrough for positioning the pressurized liquid container and providing access for cleanup upon removal of the said container.

12. The apparatus of claim 9 having a ring fixture removably mounting same in an angularly upward attitude.

References Cited

UNITED STATES PATENTS

| | | | |
|---|---|---|---|
| 2,587,075 | 2/1952 | Tice | 62—62 |
| 2,749,715 | 6/1956 | Tice | 62—62 |
| 3,000,195 | 9/1961 | Federighi | 62—64 |
| 3,170,606 | 2/1965 | Boyer | 222—402.13 |
| 3,257,821 | 6/1966 | Warner | 62—371 |

FOREIGN PATENTS 174,392  1/1922  Great Britain.

ROBERT A. O'LEARY, *Primary Examiner.*

W. E. WAYNER, *Assistant Examiner.*